(12) United States Patent
Osawa et al.

(10) Patent No.: US 9,500,157 B2
(45) Date of Patent: Nov. 22, 2016

(54) CYLINDER HEAD GASKET

(75) Inventors: Namieki Osawa, Makinohara (JP); Misaki Gushiken, Makinohara (JP)

(73) Assignee: NOK Corporation (JP)

( * ) Notice: Subject to any disclaimer, the term of this patent is extended or adjusted under 35 U.S.C. 154(b) by 244 days.

(21) Appl. No.: 14/353,378

(22) PCT Filed: Mar. 2, 2012

(86) PCT No.: PCT/JP2012/055321
§ 371 (c)(1),
(2), (4) Date: Apr. 22, 2014

(87) PCT Pub. No.: WO2013/065330
PCT Pub. Date: May 10, 2013

(65) Prior Publication Data
US 2014/0265155 A1   Sep. 18, 2014

(30) Foreign Application Priority Data

Nov. 2, 2011   (JP) .................... 2011-240929

(51) Int. Cl.
| F02F 11/00 | (2006.01) |
| F16J 15/06 | (2006.01) |
| F16J 15/08 | (2006.01) |

(52) U.S. Cl.
CPC ............ *F02F 11/002* (2013.01); *F16J 15/064* (2013.01); *F16J 15/08* (2013.01); *F16J 15/0818* (2013.01)

(58) Field of Classification Search
CPC ...... F16J 15/064; F16J 15/0818; F16J 15/08; F02F 11/002
See application file for complete search history.

(56) References Cited

U.S. PATENT DOCUMENTS

| 6,533,283 | B1 | 3/2003 | Gottel |
| 7,152,571 | B1 * | 12/2006 | Wilson ................... F01M 11/02 123/196 R |
| 2002/0117812 | A1 * | 8/2002 | Mori ..................... F16J 15/062 277/591 |
| 2011/0163508 | A1 * | 7/2011 | Nishimura ........... F16J 15/0825 277/594 |

FOREIGN PATENT DOCUMENTS

| CN | 1134508 A | 10/1996 |
| CN | 1573178 A | 2/2005 |
| CN | 101457705 A | 6/2009 |
| CN | 102108912 A | 6/2011 |
| DE | 102004040784 A1 | 3/2006 |
| JP | S59-077661 U | 5/1984 |
| JP | 2010-121662 A | 6/2010 |

* cited by examiner

*Primary Examiner* — Vishal Patel
(74) *Attorney, Agent, or Firm* — Harness, Dickey & Pierce, P.L.C.

(57) ABSTRACT

The purpose of the invention is to make it possible to perform pressurized leak tests on open loop chain case-side oil seal beads. The purpose is achieved with a cylinder head gasket, which is fitted between the cylinder block and the cylinder head and seals the three-surface sealing region obtained by combining the cylinder block, the cylinder head and the chain case, and in which an open-loop chain case-side oil seal bead that is open toward the chain case is provided in the chain case-side end of the gasket. The cylinder head gasket is characterized in that a closed-loop leak test bead is provided in the cylinder head gasket along a chain case-side oil seal bead and a leak test pressure supply path for supplying leak test pressure to the space enclosed by the leak test bead is provided.

2 Claims, 5 Drawing Sheets

CYLINDER HEAD GASKET

CROSS-REFERENCE TO RELATED APPLICATIONS

This application is a U.S. National Stage Application of International Application No. PCT/JP2012/055321 filed on Mar. 2, 2012, and published in Japanese as WO 2013/065330 A1 on May 10, 2013. This application claims priority to Japanese Application No. 2011-240929 filed on Nov. 2, 2011. The disclosures of the above applications are incorporated herein by reference.

BACKGROUND OF THE INVENTION

Field of the Invention

The present invention relates to a cylinder head gasket in relation to a sealing technique, and more particularly to a cylinder head gasket provided with a leakage detecting function of a chain case side end portion. The cylinder head gasket according to the present invention is used in a three-surface sealing portion which is constructed by a combination of a cylinder block, a cylinder head and a chain case in an internal combustion engine.

Description of the Conventional Art

Conventionally, as shown in FIGS. 2 and 3, there has been known a cylinder head gasket 11 which is installed between a cylinder block 21 and a cylinder head 31 in an internal combustion engine and seals a three-surface sealing portion 51 constructed by a combination of the cylinder block 21, the cylinder head 31 and a chain case (a front cover) 41 (refer to Japanese Unexamined Patent Publication No. 2010-121662). Further, as an example of this kind of gasket, there is a structure in which a chain case side oil seal bead 13 is provided in a chain case side end portion in the gasket 11, as shown in comparative reference views in FIGS. 4 and 5.

The chain case side oil seal bead 13 is structured such as to seal the chain case 41 so as to prevent an oil flying in all directions within the chain case 41 from leaking to an external portion of the engine, and a seal bead line is disconnected in a gasket end portion, and is not formed as a closed loop, but is formed as an open loop shape which is open toward a side of the chain case.

In the meantime, a leak test has been universally executed before shipping conventionally in the cylinder head gasket. As a current testing method, pressurization is applied to an individual closed-loop seal bead by using a leak tester, and a quality guarantee is carried out by checking a leak amount.

However, since the testing method accompanies the pressurization, the testing method can be applied only to the closed-loop seal bead, and can not be applied to the open-loop chain case side oil seal bead. Accordingly, it is necessary to execute a visual check of an outer appearance in the open-loop chain case side oil seal bead. Further, since the visual check is a human operation, and a great dispersion is generated in a reference of determining good or bad according to a level of a viewer, an improvement thereof is required.

SUMMARY OF THE INVENTION

Problem to be Solved by the Invention

The present invention is made by taking the above point into consideration, and an object of the present invention is to provide a cylinder head gasket which can be applied a leak test caused by pressurization, in an open-loop chain case side oil seal bead.

Means for Solving the Problem

In order to achieve the object mentioned above, a cylinder head gasket according to a first aspect of the present invention is a cylinder head gasket installed between a cylinder block and a cylinder head and sealing a three-surface sealing portion which is constructed by a combination of the cylinder block, the cylinder head and a chain case, comprising an open-loop chain case side oil seal bead which is provided in a chain case side end portion in the gasket and is open toward the chain case side, wherein a closed-loop leak test bead is provided along the chain case side oil seal bead, and a leak test pressure supply path is provided so as to supply a leak test pressure toward a space area which is surrounded by the leak test bead.

Further, a cylinder head gasket according to a second aspect of the present invention is the cylinder head gasket described in the first aspect mentioned above, wherein the leak test pressure supply path is constructed by a pressure supply hole which is provided so as to pass through the gasket in a thickness direction.

In the cylinder head gasket according to the present invention which is provided with the structure mentioned above, since the closed-loop leak test bead is provided along the open-loop chain case side oil seal bead, and the leak test pressure supply path is provided so as to supply the leak test pressure toward the space area which is surrounded by the leak test bead, it is possible to execute the leak test by supplying the leak test pressure from the leak test pressure supply path toward the space area which is surrounded by the leak test bead in a contact state of the leak test bead, and checking a leak amount. Therefore, it is possible to cancel the visual check and execute the leak test on the basis of the pressurization. As the leak test pressure supply path, it is preferable that a pressure supply hole is provided so as to pass through the gasket in the thickness direction, thereby supplying the pressure from an opposite surface side of the gasket toward the space area.

Effect of the Invention

The present invention achieves the following effect.

In other words, in the present invention, as mentioned above, since the closed-loop leak test bead is provided along the open-loop chain case side oil seal bead, and the leak test pressure supply path is provided so as to supply the leak test pressure toward the space area which is surrounded by the leak test bead, it is possible to execute the leak test by supplying the leak test pressure from the leak test pressure supply path toward the space area which is surrounded by the leak test bead in a contact state of the leak test bead, and checking a leak amount. Therefore, since it is possible to cancel the visual check and execute the leak test on the basis of the pressurization, it is possible to achieve a uniformization of a testing precision and an improvement of a testing workability.

DETAILED DESCRIPTION OF PREFERRED EMBODIMENTS

Construction

A closed-loop leak test bead is provided along an inner side or an outer side of an original chain case side oil seal bead.

Effect

Since it is possible to pressurize from a pressurizing hole so as to measure a leak amount by the provision of a testing closed-loop (a leak tester seal line), whereby a leak test of a chain case side oil seal bead can be achieved, a determination standard is fixed independently of the visual check, and a dispersion caused by the human operation is done away. Further, a double seal structure is achieved and an oil sealing performance is improved by adding the closed-loop to the inner side and the outer side of the chain case side oil seal bead.

Embodiment

Next, a description will be given of an embodiment according to the present invention, however, before the description of the embodiment, a description will be given of a cylinder head gasket 11 which is a comparative reference example of the embodiment of the present invention with reference to FIGS. 4 and 5. The cylinder head gasket 11 according to the comparative reference example is different from the cylinder head gasket according to the embodiment of the present invention in a point that the cylinder head gasket 11 is provided with no leak test bead and no leak test pressure supply path, however, is the same as the cylinder head gasket according to the embodiment of the present invention in the other structures. The cylinder head gasket 11 is structured as follows.

Figure 2:
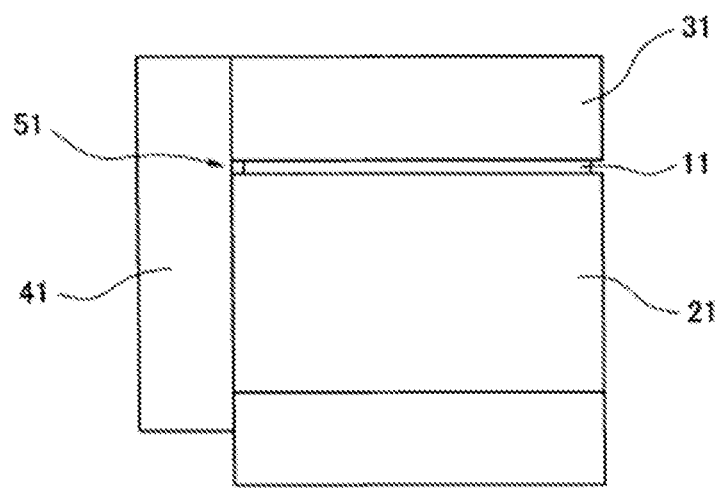
FIG. 2 is an explanatory view of a three-surface sealing portion which is constructed by a combination of a cylinder block, a cylinder head and a chain case.
Figure 3:
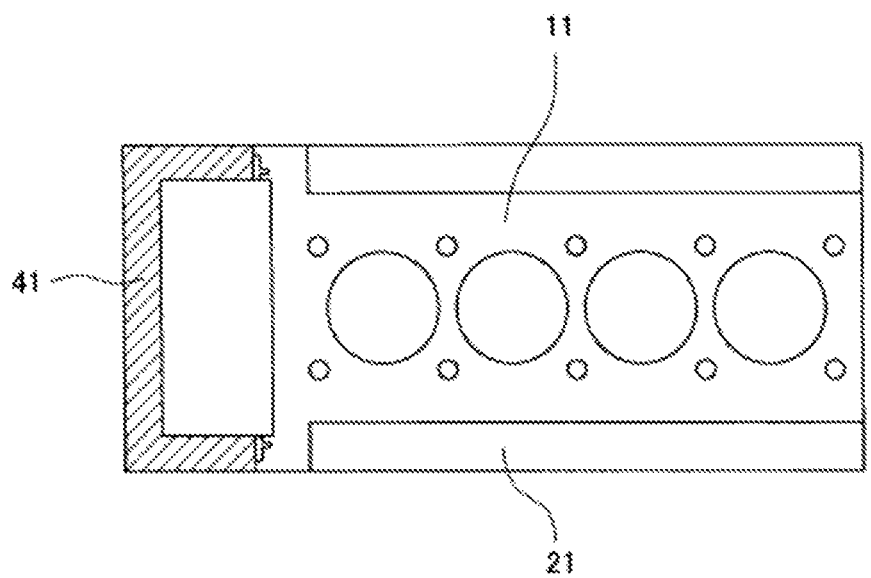
FIG. 3 is a plan view of a state in which a cylinder head gasket according to a prior art is mounted on a cylinder head.

(1) The cylinder head gasket 11 is installed between a cylinder block 21 and a cylinder head 31 (refer to FIG. 2) which are superposed each other, and seals a three-surface sealing portion 51 (refer to FIG. 2) which is constructed by a combination of the cylinder block 21, the cylinder head 31 and a chain case (a front cover) 41 arranged in side portions of them, and an open-loop chain case side oil seal bead 13 is provided in a chain case side end portion (a left end portion in the drawing) in the cylinder head gasket 11, the open-loop chain case side oil seal bead 13 being open toward a chain case side (a leftward direction in the drawing).

(2) The cylinder head gasket 11 is constructed by a metal base plate gasket, is provided with a predetermined plane shape (for example, a rectangular shape), is provided in each of both sides of one end portion in a longitudinal direction with a protruding portion 12 which is faced to a thickness surface 42 of the chain case 41, and is provided in each of the protruding portions 12 with the open-loop chain case side oil seal bead 13 which is open toward the chain case side. Each of the protruding portions 12 is provided with a leading end edge 12a and an outer side edge 12b, and a rear end edge 12c and an inner side edge 12d which are arranged in parallel to the thickness surface 42 of the chain case 41.

Figure 4:
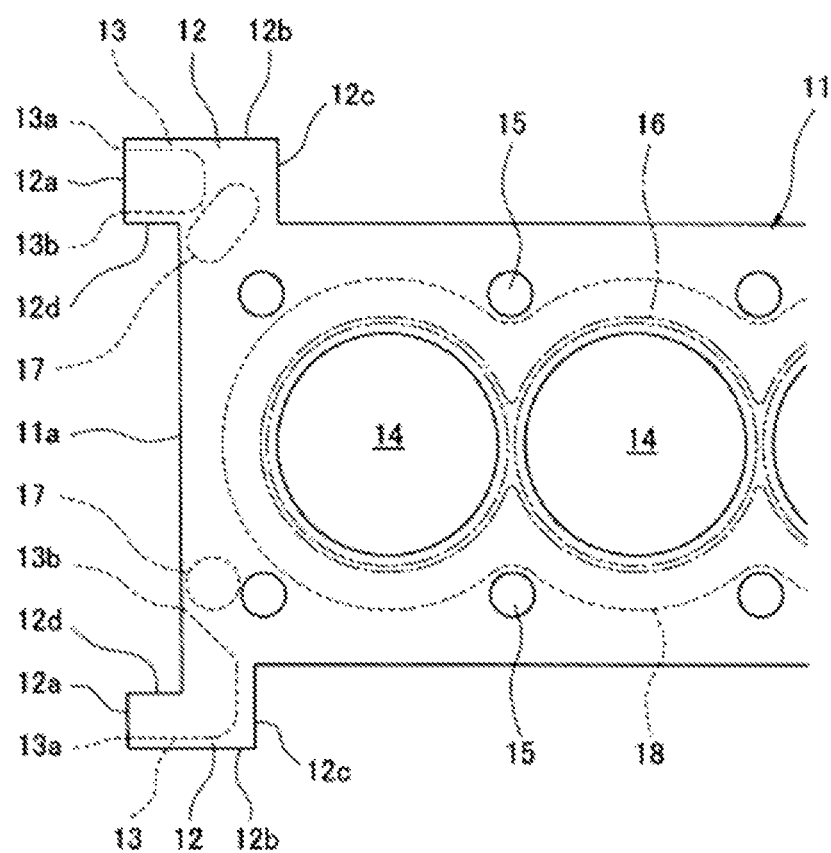
FIG. 4 is a plan view of a substantial part of a cylinder head gasket according to a comparative reference example.
Figure 5:
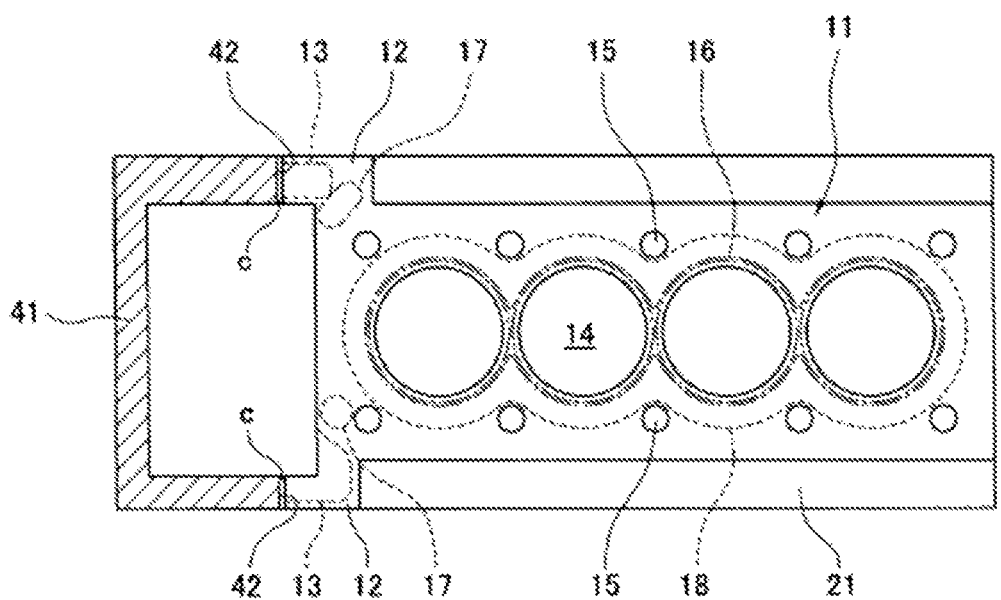
FIG. 5 is a plan view of a state in which the cylinder head gasket is mounted on a cylinder head.

In the one chain case side oil seal bead 13 which is described in an upper side in FIG. 4, both end portions 13a and 13b of the seal bead line reach the leading end edge 12a of the protruding portion 12. As a result, the one chain case side oil seal bead 13 is open toward the chain case side only in the leading end edge 12a of the protruding portion 12. Further, in the other chain case side oil seal bead 13 described in a lower side in FIG. 4, the one end portion 13a of the seal bead line reaches the leading end edge 12a of the protruding portion 12, and the other end portion 13b reaches the leading end portion 11a of the gasket 11. As a result, the other chain case side oil seal bead 13 is open toward the chain case side in the leading end edge 12a and the inner side edge 12d of the protruding portion 12 and the leading end portion 11a of the gasket 11.

(4) A gap c formed between the thickness surface 42 of the chain case 41 and the protruding portion 12 is closed by an application of a fluid rubber (FIPG) or an extrusion of a seal rubber attached to the metal base plate portion of the gasket 11 at the installing time.

(5) The cylinder head gasket 11 may be constructed by one metal base plate, however, is constructed, in many cases, by a superposed combination of a plurality of metal base plates (a laminated type gasket). A thin film shaped rubber layer may be attached to a surface (one surface or both surfaces in a thickness direction) of the metal base plate.

(6) A hole portion such as a bore portion 14 or an assembling bolt insertion hole 15 is provided on a flat surface of the cylinder head gasket 11 so as to pass through in a thickness direction, and seal beads such as closed-loop oil seal beads 16 and 17 and a closed-loop water seal bead 18 are provided according to a predetermined layout.

(7) Each of the seal beads 13, 16, 17 and 18 is formed as a half bead shape or a full bead shape according to its function or arrangement.

In the cylinder head gasket 11 provided with the structures (1) to (7) mentioned above, since each of the chain case side oil seal bead 13 provided in the chain case side end portion in the gasket 11 is formed as an open-loop shape which is open toward the chain case side (the leftward direction in the drawing), the leak test on the basis of the pressurization can not be applied thereto, but it is necessary to depend on the visual check.

Accordingly, in the cylinder head gasket 11 according to the embodiment of the present invention, the following structure is added.

Figure 1:
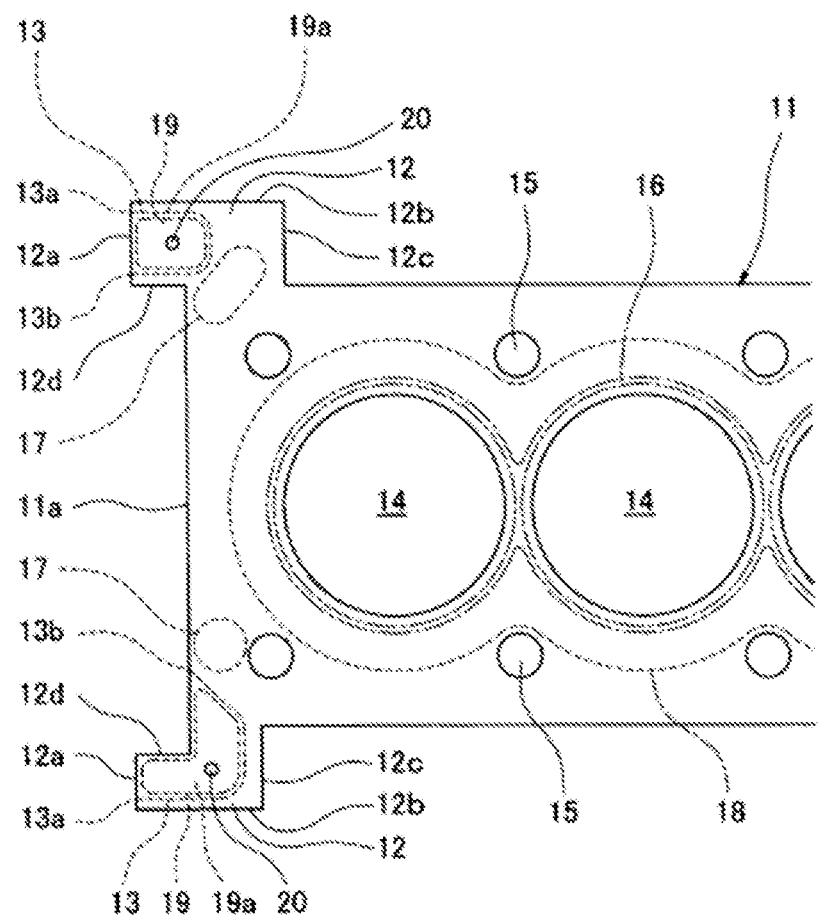
FIG. 1 is a plan view of a substantial part of a cylinder head gasket according to an embodiment of the present invention.

In other words, as shown in FIG. 1, a closed-loop leak test bead 19 is provided along an inner side of each of the open-loop chain case side oil seal beads 13, and a leak test pressure supply path 20 is provided for supplying a leak test pressure toward a space area 19a which is surrounded by the leak test bead 19. In the embodiment, the leak test pressure supply path 20 is formed by a pressure supply hole which is provided so as to pass through the gasket 11 in its thickness direction. Since the leak test bead 19 is formed as a closed loop, it is possible to store the pressure in the space area 19a which is surrounded by the leak test bead 19.

Therefore, according to the gasket 11 to which the leak test bead 19 and the leak test pressure supply path 20 are added, it is possible to execute the leak test on the basis of the pressurization whether or not the protruding portion 12 deforms in the gasket thickness direction in relation to the main body portion of the gasket 11 (if the protruding portion 12 deforms in the gasket thickness direction in relation to the main body portion of the gasket 11, both of the chain case side oil seal bead 13 and the leak test bead 19 may come to a state in which they are not sufficiently in contact with the other member), by mounting the gasket 11, for example, on a test table, supplying the leak test pressure from the leak test pressure supply path 20 toward the space area 19a which is surrounded by the leak test bead 19 in a contact state of the leak test bead 19 with the test table, and checking a leak amount at that time. Therefore, since it is possible to cancel the visual check and execute the leak test on the basis of the pressurization, it is possible to achieve a uniformization of a testing precision and an improvement of a testing workability. The plane shape of the closed-loop leak test bead 19 is not particularly limited.

What is claimed is:

1. A cylinder head gasket installed between a cylinder block and a cylinder head and sealing a three-surface sealing portion which is constructed by a combination of cylinder block, the cylinder head and a chain case, the cylinder head gasket comprising:
    a chain case side end portion including a first protruding portion located on a first end of the chain case side end portion and a second protruding portion located at an opposite second end of the chain case side portion;
    a first open-loop seal bead that is open toward the chain case;
    a second open-loop seal bead that is open toward the chain case;
    a first closed-loop seal bead located within the first open-loop seal bead;
    a second closed-loop bead located within the second open-loop seal bead; and
    a leak test pressure supply path which is provided so as to supply leak test pressure toward a space area which is surrounded by at least one of the first and second closed-loop seal beads,
    wherein at least one of the first and second closed-loop seal beads is configured to contain the leak test pressure that is introduced through the leak test pressure supply path during a leak test of the cylinder head gasket; and
    an entirety of the first open-loop seal bead and an entirety of the first closed-loop seal bead are formed in the first protruding portion, and a portion of the second open-loop seal bead and a portion of the second closed-loop seal bead are formed in the second protruding portion.

2. The cylinder head gasket according to claim 1, wherein the leak test pressure supply path is constructed by a pressure supply hole which passes through the gasket in a thickness direction.

* * * * *